(12) United States Patent
Song et al.

(10) Patent No.: US 9,019,664 B2
(45) Date of Patent: Apr. 28, 2015

(54) MAGNETORESISTIVE SENSOR WITH VARIABLE SHIELD PERMEABILITY

(71) Applicant: Seagate Technology LLC, Cupertino, CA (US)

(72) Inventors: Dion Song, Eden Prairie, MN (US); Dimitar Velikov Dimitrov, Edina, MN (US); Victor Boris Sapozhnikov, Minnetonka, MN (US); Mohammed Sharia Ullah Patwari, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/898,210

(22) Filed: May 20, 2013

(65) Prior Publication Data

US 2014/0340793 A1    Nov. 20, 2014

(51) Int. Cl.
*G11B 5/39*    (2006.01)
*G11B 5/11*    (2006.01)

(52) U.S. Cl.
CPC .............. *G11B 5/3912* (2013.01); *G11B 5/11* (2013.01)

(58) Field of Classification Search
CPC .......... G11B 5/10; G11B 5/11; G11B 5/3143; G11B 5/33; G11B 5/39; G11B 5/3903; G11B 5/3906; G11B 5/3912; G11B 5/3932
USPC .......... 360/319, 324.1, 324.11, 324.12, 324.2
See application file for complete search history.

(56) References Cited

U.S. PATENT DOCUMENTS

| | | | |
|---|---|---|---|
| 6,177,207 B1 * | 1/2001 | Koike ........................ | 428/811.5 |
| 6,525,911 B1 * | 2/2003 | Gill .............................. | 360/319 |
| 7,558,027 B2 * | 7/2009 | Hirata et al. .................. | 360/319 |
| 7,952,839 B2 * | 5/2011 | Yamazaki et al. ......... | 360/324.1 |
| 8,000,063 B2 * | 8/2011 | Yamaguchi et al. ......... | 360/319 |
| 2003/0086215 A1 * | 5/2003 | Kief et al. ..................... | 360/319 |
| 2007/0201167 A1 * | 8/2007 | Lin .............................. | 360/319 |
| 2010/0053820 A1 * | 3/2010 | Miyauchi et al. ............. | 360/319 |
| 2012/0327531 A1 | 12/2012 | Takahashi et al. | |

* cited by examiner

*Primary Examiner* — Jefferson Evans
(74) *Attorney, Agent, or Firm* — HolzerIPLaw, PC (57) ABSTRACT

Implementations disclosed herein allow a signal detected by a magnetoresistive (MR) sensor to be improved by providing for one or more regions of reduced anisotropy proximal to a sensor stack within a shielding structure.

19 Claims, 11 Drawing Sheets

MAGNETORESISTIVE SENSOR WITH VARIABLE SHIELD PERMEABILITY

BACKGROUND

In a magnetic data storage and retrieval system, a magnetic read/write head includes a reader portion having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information to recover the information encoded on the disc.

Improvements in magnetic storage media technology allow areal recording densities on magnetic discs that are available today. However, as areal recording densities increase, smaller, more sensitive MR sensors are desired. As MR sensors become smaller in size, the MR sensors have potential to exhibit an undesirable magnetic response to applied fields from the magnetic disc. An effective MR sensor may reduce or eliminate magnetic noise and provide a signal with adequate amplitude for accurate recovery of the data written on the disc.

SUMMARY

Implementations described and claimed herein provide for a sensor apparatus having a sensor stack located within a shielding structure. The shielding structure has a first region near the sensor stack with a permeability that is greater than a permeability of a second region of the shielding structure away from the sensor stack.

This Summary is provided to introduce an election of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

BRIEF DESCRIPTIONS OF THE DRAWINGS

FIG. 6b illustrates another view of the example MR sensor of FIG. 6a.

DETAILED DESCRIPTION

Pulse slimming (e.g., reducing the width of the magnetic signal detected by a magnetoresistive (MR) sensor) is one way to improve linear density resolution of MR sensors. Pulse slimming, also referred to PW50 reduction, may be accomplished by increasing the permeability of sensor shields. However, increasing shield permeability can incidentally reduce shield stability. A shield with globally increased permeability is more likely to couple to a writer element or an exterior stray field of a transducer head, decreasing a signal to noise (SNR) ratio of a signal read from a magnetic media. Thus, there are competing objectives of both increasing shield permeability to improve PW50 and keeping shield permeability low to preserve shield stability in MR sensors.

The implementations disclosed herein increase shield permeability locally (rather than globally) within regions that are in close proximity to a sensor stack to achieve a desired PW50 decrease while mitigating incidental reductions in signal quality.

The example MR sensors disclosed herein include a sensor stack within a shielding structure. According to one implementation, a magnetic orientation of a region of the shielding structure is biased antiparallel to the rest of the shielding structure to create a region of "shield softening" (i.e., decreased anisotropy) interior to the shielding structure and adjacent or proximal to the sensor stack. Such regions of decreased anisotropy have a permeability (e.g., a local permeability) that is greater than a global permeability of the shielding structure. As used herein, the term "global permeability" refers to a total permeability of one or more shield elements of the shielding structure.

The technology disclosed herein may be used in conjunction with a variety of different types of MR sensors (e.g., anisotropic magnetoresistive (AMR) sensors, tunneling magnetoresistive (TMR) sensors, tunneling giant magnetoresistive (TGMR) sensors, etc.). Accordingly, the implementations disclosed herein may also be applicable to new MR sensor designs that are based on new physical phenomena such as lateral spin valve (LSV), spin-hall effect (SHE), spin torque oscillation (STO), etc.

Figure 1:
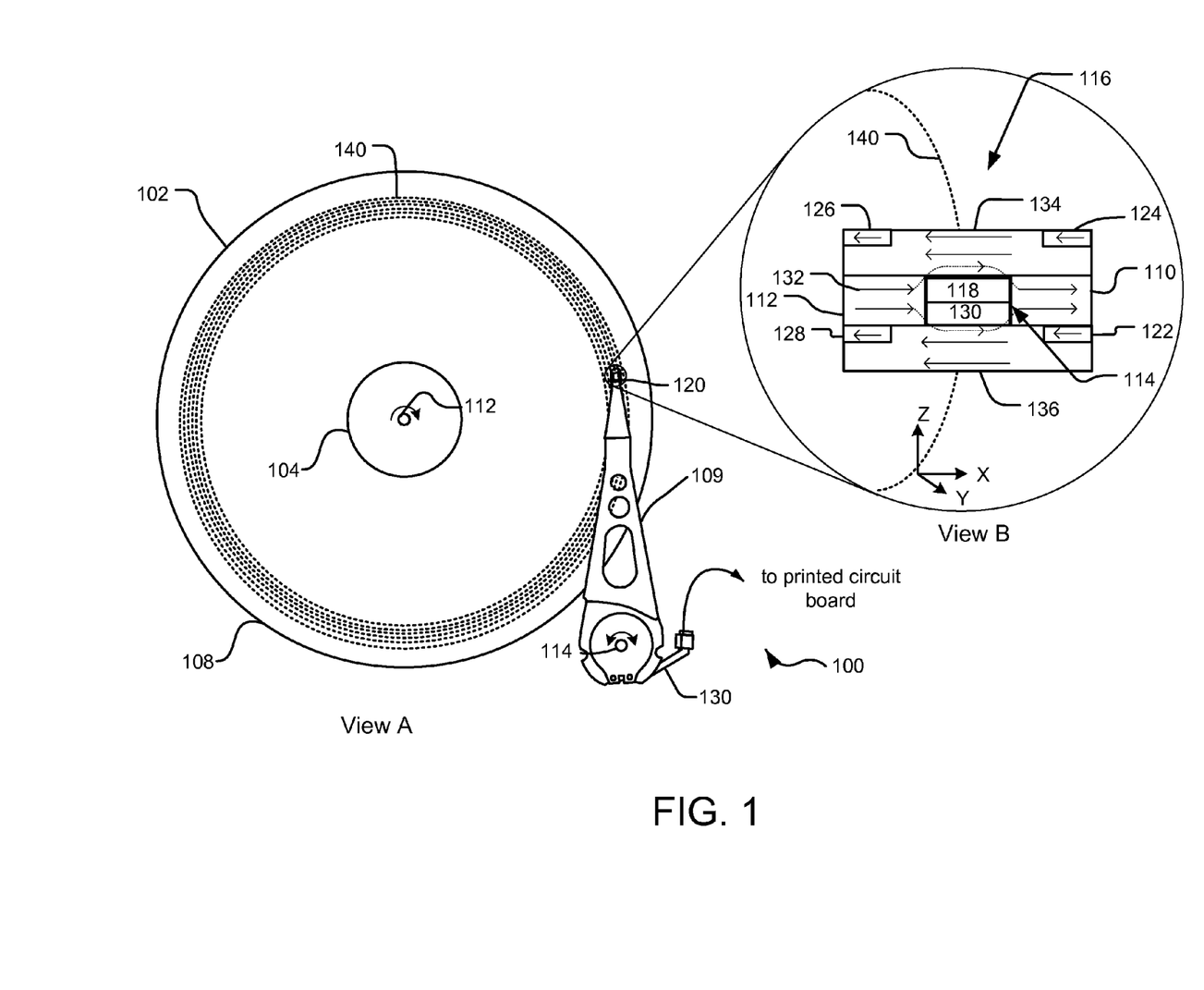
FIG. 1 illustrates a plan view of an example disc drive assembly that includes an MR sensor on a slider.

FIG. 1 illustrates a plan view of an example disc drive assembly 100. The example disc drive assembly 100 includes a slider 120 on a distal end of an actuator arm 109 positioned over a media disc 108. A rotary voice coil motor that rotates about an actuator axis of rotation 114 is used to position the slider 120 on a data track (e.g., a data track 140) and a spindle motor that rotates about disc axis of rotation 112 is used to rotate the media. Referring specifically to View A, the media 108 includes an outer diameter 102 and inner diameter 104 between which are a number of data tracks (e.g., the data track 140), illustrated by circular dotted lines. A flex cable 130 provides the requisite electrical connection paths for the slider 120 while allowing pivotal movement of the actuator arm 109 during operation.

The slider 120 is a laminated structure with a variety of layers performing a variety of functions. The slider 120 includes a writer section (not shown) having a main write pole magnetically coupled to a return or opposing pole by a yoke or pedestal. A magnetization coil surrounds the yoke or pedestal to induct magnetic write pulses in the write pole.

The slider 120 also includes one or more MR sensors (e.g., an MR sensor 116, shown in view B) for reading data off of the media 108. View B illustrates a side of the MR sensor 116 that faces an air-bearing surface (ABS) of the media disc 108 when the disc drive assembly 100 is in use. Thus, the MR sensor 116 shown in view B may be rotated by about 180 degrees about (e.g., about a z-axis) when operationally attached to the slider 120 shown in View A.

The MR sensor 116 of the slider 120 includes a sensor stack 114 sandwiched between shield elements 134 and 136. The shield elements 134 and 136 isolate the sensor stack 114 from electromagnetic interference, primarily z-direction interference, and serve as electrically conductive first and second electrical leads connected to processing electronics (not shown). In one implementation, the first and second shield elements 134 and 136 permit the sensor stack 114 to be affected by magnetic fields of a data bit directly under the sensor stack 114 while reducing or blocking magnetic field interference of other, adjacent data bits.

In operation, a data bit along a track 140 on the media disc 108 may consecutively pass under the shield element 134, under the sensor stack 114, and then under the shield element 136. Therefore, the edge of the sensor stack 114 proximal to the shield element 134 (i.e., the "top shield") may be referred to as the "leading edge" of the sensor stack and the edge of the sensor stack 114 proximal to the shield element 136 (i.e., the "bottom shield") may be referred to as the "trailing edge" of the sensor stack.

In one implementation, the shield elements 134, 136 are constructed of a soft magnetic material (e.g., a Ni—Fe alloy). In another implementation, the shield elements 134, 136 have a z-direction thickness that is substantially larger than the length of a single data bit on a rotating magnetic media. Such thickness may be on the order of 1-2 microns (e.g., approximately one micron) along the data track 140.

The sensor stack 114 includes a plurality of layers that perform a plurality of functions. In various implementations, the number of such layers and their associated functions may vary. However, the example sensor stack 114 of FIG. 1 includes a first soft magnetic layer 130 and a second soft magnetic layer 118. Permanent magnets (PMs) (e.g., PM elements 110 and 112) are adjacent to the first soft magnetic layer 130 to bias the magnetic orientation of the first soft magnetic layer 130 in a given direction. The direction of such biasing is indicated by flux lines (e.g., a flux line 132) of the PM elements 112 and 110 in the positive x-direction.

With rotation of its magnetization inhibited, the first soft magnetic layer 130 is termed the "pinned layer." The second soft magnetic layer 118 rotates freely in response to an external field and is called the "free layer." Such rotation causes a change in electrical resistivity of the sensor stack 114 between the shield elements 134 and 136. The changes in electrical resistivity of the read element 114 are correlated to magnetically polarized regions on the media disc 108, which in turn correspond to stored data on the magnetic media.

The MR sensor 116 further includes one or more domain control stabilization (DCS) tabs (e.g., DSC tabs 122, 124, 126, and 128). The DCS tabs are recessed from close vicinity to the sensor stack 114 (e.g., separated from the sensor stack 114 by a distance which may be greater than or equal to an x-direction width of the sensor stack 114) and are each in direct contact with one of the shield elements 134 or 136. In another implementation, the DCS tabs are magneto-statically coupled to the shield elements 134 and 136, but are not in direct contact with the shield elements 134 and 136.

The DCS tabs may be constructed of a variety of materials sufficient to bias the magnetic field of the shield elements 134 and 136, such as PM material (e.g., CoPT, CoCrPT, FePt, FePtX, etc.) or antiferromagnetic (AFM) material (e.g., IrMn, PtMn, etc.). The DCS tabs function to bias the direction of magnetic orientation of one or both of the shield elements 134 or 136 to be antiparallel (i.e., opposite) to or substantially different from the magnetic orientation of the PM elements 110 and 112.

As used herein, a magnetic orientation of one element is "substantially different" from the magnetic orientation of another element when there exists an angular difference between the two orientations sufficient to create a region of locally reduced anisotropy. According to one implementation, a magnetic orientation of one element is substantially different from the magnetic orientation of another element when the magnetic orientations of the two elements vary between 90 and 180 degrees.

Although FIG. 1 illustrates two DCS tabs biasing each of the shields (e.g., DCS tabs 122 and 128 to bias the shield element 134 and DCS tabs 126 and 124 to bias the shield element 136), any number (one or more) of such DCS coupling elements may be used.

As illustrated by the dotted arrows on the MR sensor 116, some of the flux from the PM elements 110 and 112 enters onto the shield elements 134 and 136 in close proximity to the first soft magnetic layer 130 and the second soft magnetic layer 118. Some or all of this flux is opposite to the direction of the shield magnetization and effectively reduces anisotropy (e.g., "softens" the shield) in the regions directly above and below the sensor stack 114 where flux interference occurs. This reduced anisotropy translates to a localized increase in permeability in regions proximate to the leading and trailing edges of the sensor stack 114 (e.g., at or near regions indicated by dotted arrows). In one implementation, such regions of locally increased permeability are about 10-20 nm in width (e.g., an x-direction width).

Figure 2:
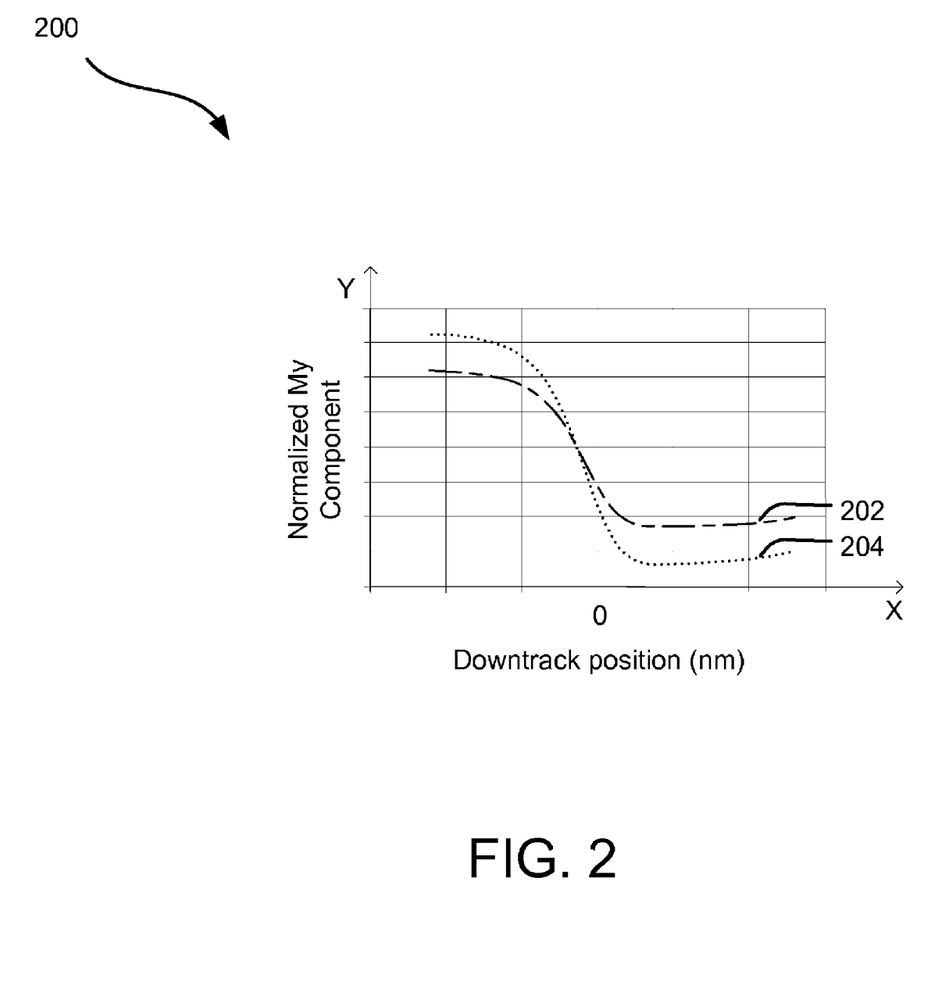
FIG. 2 is an example graph illustrating a response of a top shield in an MR sensor.

FIG. 2 is a graph 200 illustrating a response of the top shield (e.g., the shield that is in closer proximity to the free layer) under the influence of an isolated data bit transition on a magnetic media for two different top shield magnetic orientation biasing directions. On the graph 200, the x-axis represents the downtrack position of the isolated data bit transition relative to the middle of an MR sensor (i.e., at x=0). The y-axis represents the magnetization of the shield toward the ABS that is attributable to the isolated bit transition.

Data for two different PM shield orientations is shown. The line 202 illustrates data for an MR sensor having a top shield magnetic field biased in a direction parallel to the magnetic orientation of PM elements. The line 204 illustrates data for another MR sensor having a top shield magnetic field biased in a direction antiparallel (i.e., opposite) to the magnetic orientation of PM elements. Thus, the graph 200 indicates that the local shield response is significantly larger in the case where the top shield magnetic field is biased in a direction antiparallel to the magnetic orientation of the PM elements. This increased shield response illustrated by the line 204 is indicative of significantly improved local permeability.

Figure 3:
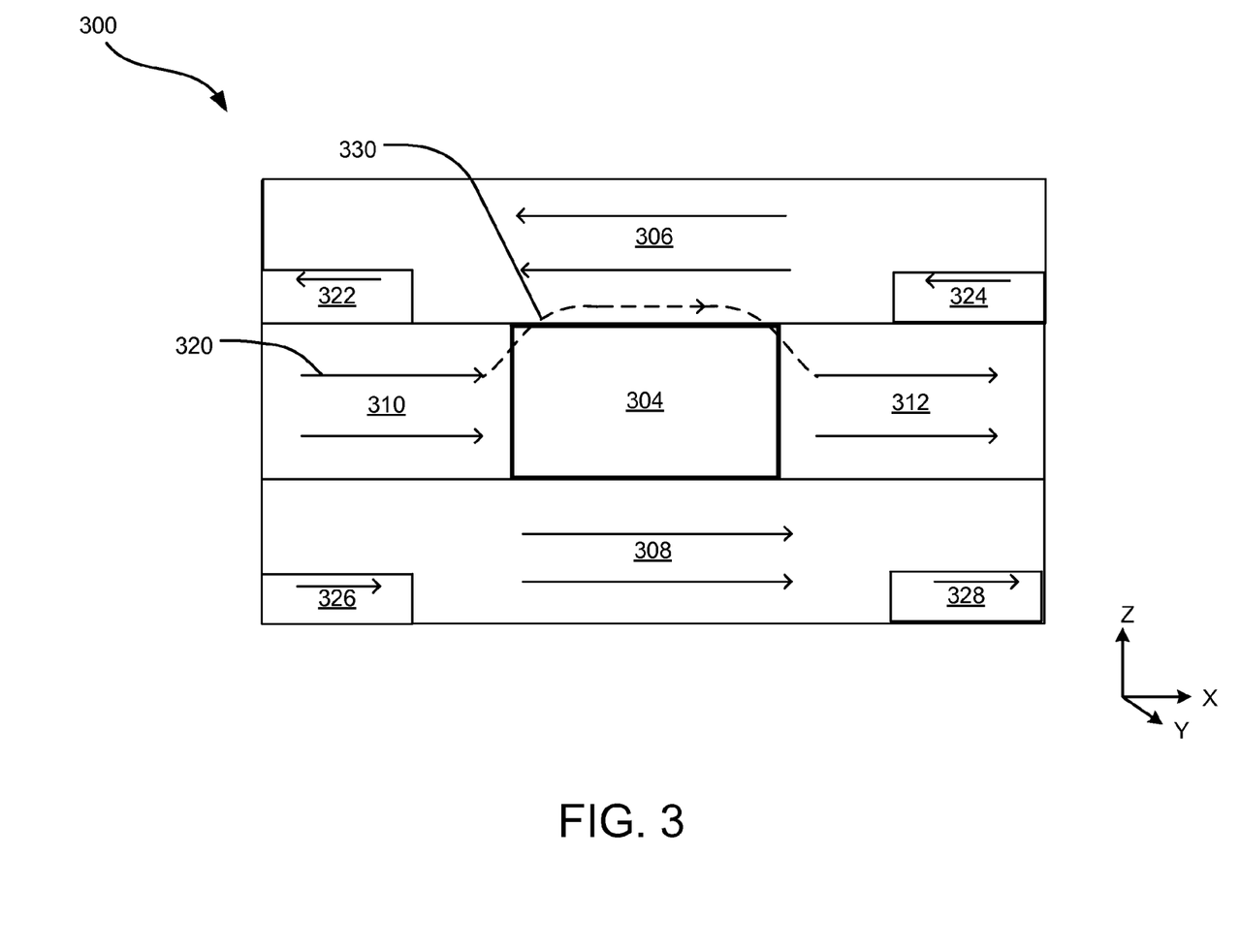
FIG. 3 illustrates an example MR sensor with locally enhanced shield permeability.

FIG. 3 illustrates an example MR sensor 300 having an enhanced permeability region proximal to a leading edge of a sensor stack 304. The sensor stack 304 includes a plurality of layers (not shown) that perform a plurality of functions. PM elements 310 and 312 are on opposite sides of the sensor stack 304 in the cross-track direction (i.e., the x-direction) and introduce a magnetic bias (e.g., a bias in the positive x-direction) in a pinned layer (not shown) of the sensor stack 304. The magnetic orientation of a top shield element 306 (indicated by arrows in the top shield element 306) is biased by domain control stabilization (DCS) tabs 322 and 324 in a direction substantially different from or anti-parallel to the magnetic orientation of the PM elements (indicated by arrows in the PM elements 310 and 312).

Because some of the magnetic flux of the top shield element 306 interferes with opposing flux of the PM elements 310 and 312, a region of increased permeability is created in the area between the sensor stack 304 and the top shield element 306 (e.g., at or near the area of flux interference indicated by the dotted arrow 330).

The MR sensor 300 also has a bottom shield element 308 with a magnetic orientation substantially parallel to the magnetic orientation of the PM elements 310 and 312. Such magnetic orientation is set by DCS tabs 326 and 328. Therefore, the implementation of FIG. 3 does not include a region of locally enhanced permeability in the region between the bottom shield element 308 and the sensor stack 304.

Figure 4:
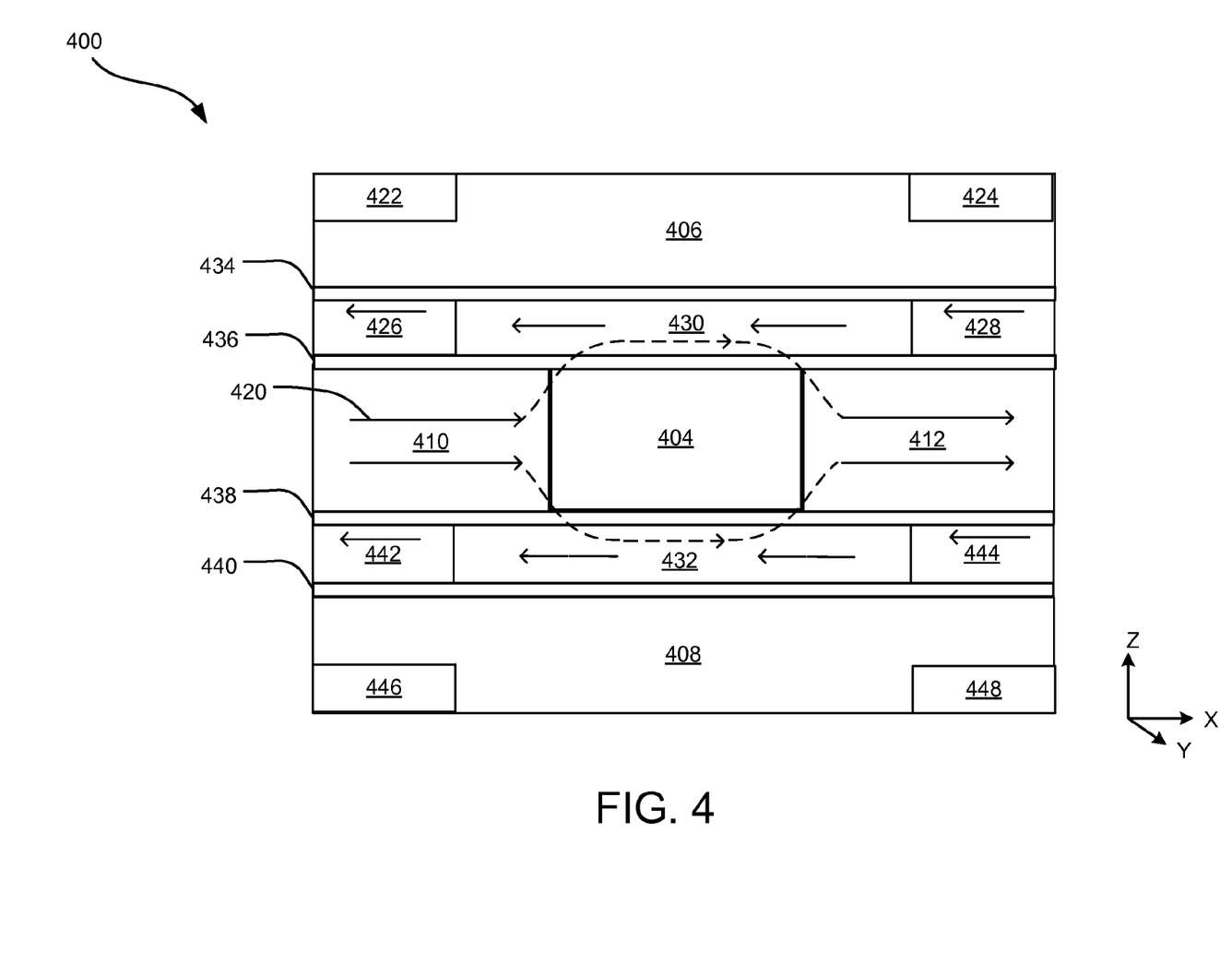
FIG. 4 illustrates another example MR sensor with locally enhanced shield permeability.

Decoupling shield elements from the shielding structure may boost resolution gain. This is because decoupling allows for more magnetic rotation in the locally increased permeability regions. FIG. 4 illustrates an example MR sensor 400 that includes decoupled shield elements 430 and 432 biased antiparallel to PM elements 410 and 412 to create regions of locally enhanced permeability proximal to leading and trailing edges of a sensor stack 404.

In particular, the MR sensor 400 includes top and bottom composite shields that each include a main shield element (e.g., a top main shield element 406 and a bottom main shield element 408) and a decoupled thin shield element (e.g., a decoupled thin top element 430 and a decouple thin bottom shield element 432). The top main shield element 406 is adjacent to and in contact with upper DCS tabs 422 and 424 and the bottom main shield element 408 is adjacent to and in contact with lower DCS tabs 446 and 448. Non-magnetic layers 434 and 440 separate the decoupled thin top and bottom shield elements 430 and 432 from main top and bottom shield elements 406 and 408, respectively. Non-magnetic spacer layers 436 and 438 separate the decoupled thin top and bottom shield elements 430 and 432 and the associated biasing elements (i.e., DCS elements 426, 428, 442 and 444) from the sensor stack 404 and from the PM elements 410 and 412.

In FIG. 4, the enhanced permeability regions (indicated by the path of dotted lines through the decoupled thin shield elements 430 and 432) are not influenced by the magnetic orientation of the top and bottom main shield elements 406 and 408. Therefore, the magnetic orientation of the top and bottom main shield elements 406 and 408 may be biased in any direction, either by additional DCS tabs (not shown) or by a shaping or annealing process.

The decoupled thin top shield element 430 has a magnetic orientation biased (e.g., in the negative x-direction) by thin top shield DCS tabs 426 and 428. Similarly, the decoupled thin bottom shield element 432 has a magnetic orientation biased by thin bottom shield DCS tabs 442 and 444 (e.g., also in the negative x-direction). Because the magnetic orientation of the decoupled thin shield elements 430 and 432 is substantially antiparallel to the orientation of PM elements 410 and 412 (e.g., in the positive x-direction), areas of locally increased permeability exist within each of the decoupled thin shield elements 430 and 432 (at or near the regions indicated by dotted lines).

In FIG. 4, the top and bottom main shield elements 406 and 408 provide shielding on a global scale while the decoupled thin shield elements 430 and 432 react locally to isolated media transitions. Consequently, PW50 reduction that results from the implementation of FIG. 4 may be considerably improved from the PW50 reduction that results from an implementation including non-composite shields (e.g., FIG. 1) where the shields have a thickness much greater than the thickness of a single data bit.

In one implementation, one or both of the decoupled thin top and bottom shield elements 430 and 432 have a z-direction thickness that is substantially equal to or comparable to the thickness of a single data bit on a magnetic media disc that rotates below the MR sensor 400. In one implementation, this thickness is about 10-20 nanometers. Thus, the decoupled thin top and bottom shield elements 430 and 432 may each react locally to an individual data bit as the data bit passes below the MR sensor 400. In contrast, the top and bottom main shield elements 406 and 408 may have a substantially greater thickness. In one implementation, the top and bottom main shield elements have a thickness of about one micron.

Figure 5:
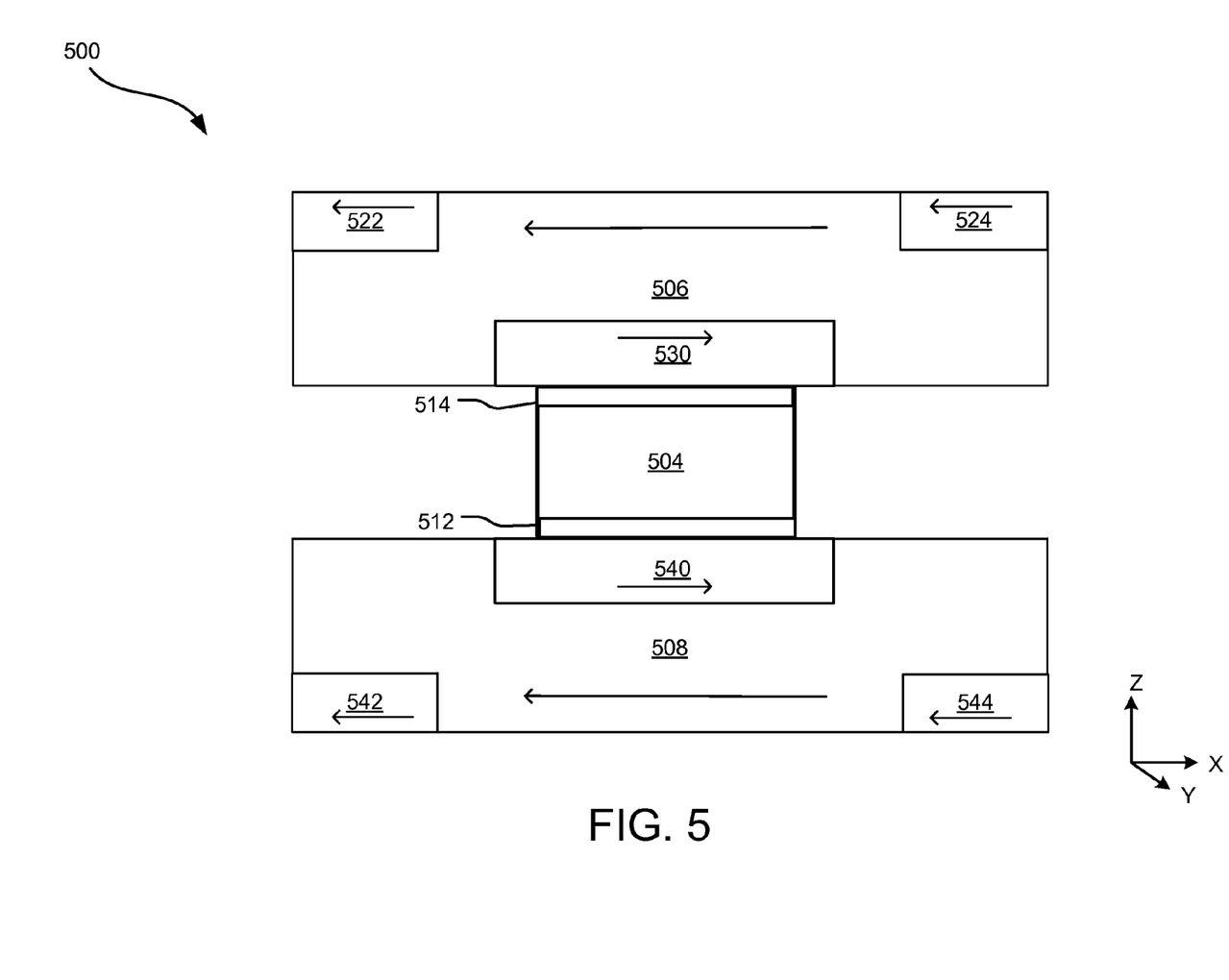
FIG. 5 illustrates another example MR sensor with locally enhanced shield permeability.

FIG. 5 illustrates an example MR sensor 500 that has regions of locally enhanced permeability proximal to leading and trailing edges of a sensor stack 504. The regions of locally enhanced permeability are created by local permeability tuning elements 530 and 540. The local permeability tunings elements 530 and 540 may be any number of different structures that locally reduce shield anisotropy (e.g., by creating a controlled amount of magnetic flux at an orientation that is substantially different from a magnetic orientation of one or both of shield elements 506 and 508. In FIG. 5, the local permeability tuning elements 530 and 540 each have a magnetic orientation that is substantially antiparallel to a global shield magnetic orientation set by the shield elements 506 and 508. In other implementations, one or both of the local permeability tuning elements 530 and 540 have a magnetic orientation that is substantially different from (but not antiparallel to) the magnetic orientation of one or both of the shield elements 506 and 508.

In one implementation, the local permeability tuning elements 530 and 540 are made of anti-ferromagnetic (AFM) material that couples the local permeability tuning elements 530 and 540 to in-stack shield layers 512 and 514. The interface between each of the local permeability tuning elements 530 and 540 and the adjacent in-stack shield layer 512 or 514 may be varied, such as by using one or more tuning layers to increase or decrease the strength of the coupling field.

In another implementation, the MR sensor does not include the in-stack shield layers 512 and 514, and the local permeability tuning elements 530 and 540 are made of permanent magnetic material. In yet another implementation, the local permeability tuning elements 530 and 540 are other materials or structures that provide magnetic bias.

The top and bottom shield elements 506 and 508 each have a magnetic orientation fixed (e.g., in the negative x-direction) by adjacent DCS coupling elements 522, 524, 542, and 544. In particular, the DCS coupling elements 522 and 524 fix the magnetic orientation of the top shield element 506 and the DCS coupling elements 542 and 544 fix the magnetic orientation of the bottom shield element 508.

The sensor stack 504 includes a number of layers that perform a variety of different functions, which may be the same or similar to those in other implementations discussed herein. However, unlike the implementations of FIGS. 1, 3, and 4, the implementation of FIG. 5 does not include PM elements on opposing sides of the sensor stack 504 to bias a pinned layer in the sensor stack 504.

Figure 6A:
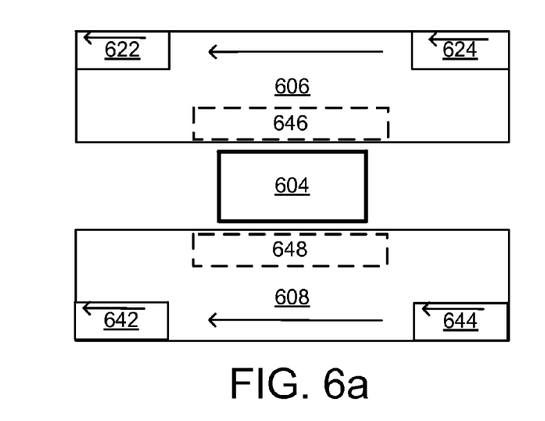
FIG. 6a illustrates a view of an ABS-facing surface of an example MR sensor with locally enhanced shield permeability.

FIG. 6a illustrates a view of an ABS-facing surface of an example MR sensor that has regions of locally enhanced permeability (indicated by dotted boxes 646 and 648) proximal to leading and trailing edges of a sensor stack 604. The regions of locally enhanced permeability 646 and 648 are created by a local permeability tuning element positioned behind the sensor stack 604 (not shown in FIG. 6a). This local permeability tuning element may be any of a number of different structures (e.g., AFM or PM material) that create a controlled bias field in the vicinity of one or both of shield elements 606 and 608. The direction of the controlled bias field may be antiparallel to or substantially different from a global magnetic orientation of the shield elements 606 and 608. An example local permeability tuning element capable of creating the enhanced permeability regions 646 and 648 is illustrated in FIG. 6b.

Figure 6B:
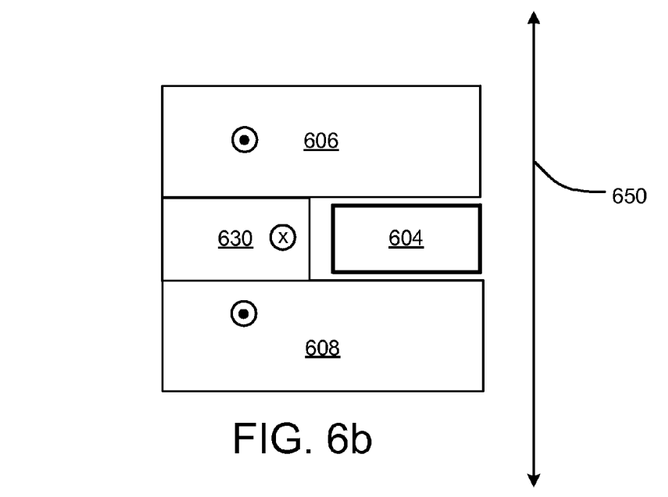

FIG. 6b illustrates the MR sensor of FIG. 6a rotated about the z-axis by approximately 90 degrees. In FIG. 6b, a local permeability tuning element 630 is visible adjacent to a sensor stack 604. The magnetic orientation of the shield elements 606 and 608 is in a direction into the page, and the magnetic orientation of the local permeability tuning element 630 is in a direction out of the page. The local permeability tuning element 630 may be, for example, PM or AFM material that is recessed from an adjacent ABS surface 650. The distance of such recession is, in one implementation, equal to or less than 30 nm.

The local permeability tuning element 630 locally rotates the magnetic orientation of the shield elements 606 and 608 into a direction antiparallel to the global magnetic orientation of the shield elements 606 and 608. In other implementations, the local permeability tuning element 630 locally rotates the magnetic orientation of the shield elements 606 and 608 into a direction substantially different from (but not antiparallel to) the global magnetic orientation of the shield elements 606 and 608. Such rotation softens the shield elements 606 and 608 close to the local permeability tuning element 630 (e.g., in a region which may include the ABS-facing surface of the shield elements 606 and 608).

In some MR sensors, such as a beveled trilayer design sensor, PM material is located on the back side of the sensor stack 604, such as in a position the same or similar to the position of the local permeability tuning element 630. In such designs, PM material (which may or may not be required to bias the sensor itself) may provide a bias field to the front portion (e.g., proximate to the ABS) of the shield elements 606 and 608. Such bias field locally softens the shield elements 606 and 608.

Figure 7:
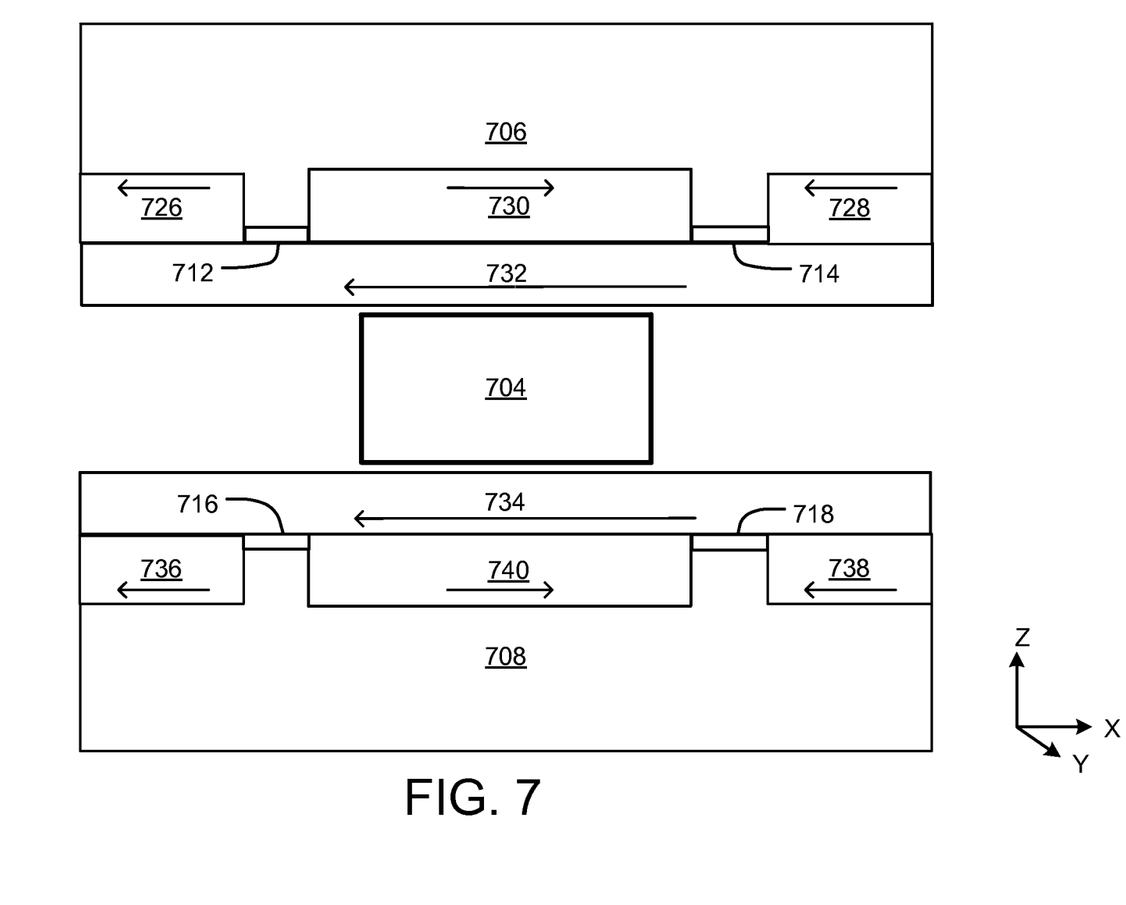
FIG. 7 illustrates another example MR sensor locally enhanced shield permeability.

FIG. 7 illustrates an example MR sensor 700 that includes composite shields and local permeability tuning elements 730 and 740. The magnetic orientation of decoupled thin shield elements 732 and 734 is biased substantially antiparallel to the magnetic orientation of the local permeability tuning elements 730 and 740. In other implementations, the decoupled thin shield elements 732 and 734 have a magnetic orientation that is substantially different from, but not antiparallel to, the magnetic orientation of the local permeability tuning elements 730 and 740. Such predetermined angular separation between the magnetic orientation of one or more of the decoupled thin shield elements 732 and 734 and the magnetic orientation of local permeability tuning elements 730 and 740 increases permeability within the decoupled thin shield elements 732 and 734.

The magnetic orientation of each of the main shield elements 706 and 708 and may be in any direction (not shown). The magnetic orientation of the decoupled thin shield elements 732 and 734 is fixed (e.g., in the negative x-direction).

In particular, the magnetic orientation of the decoupled thin top shield 732 is biased by thin top shield DCS elements 726, and the magnetic orientation of the decoupled thin bottom shield 734 is fixed by thin bottom shield DCS elements 736 and 738. Non-magnetic layers 712, 714, 716, and 718 separate the decoupled thin shield elements 732 and 734 from the corresponding main shield elements 706 or 708, respectively.

The local permeability tuning elements 730 and 740 may be made of PM material, antiferromagnetic (AFM) material, or other material or structure that provides a hard magnetic bias to the MR sensor 704. If the local permeability tuning elements 730 and 740 are made of AFM material, the magnitude of the biasing field may depend on the exchange coupling energy created at the interface between each of the local permeability tuning elements 730 and 740 and the adjacent decoupled thin shield element 732 or 734. The material, anneal temperature, and/or composition of the local permeability tuning elements 730 and 740 may be selected or varied to control the magnitude of the resulting biasing field.

In general, the amount of local permeability enhancement may be determined experimentally by selecting an optimized tradeoff between linear density gain and possible magnetic stability issues. If the local permeability tuning elements 730 and 740 are constructed of a PM material, the thickness (z-direction), lateral dimensions (x and y directions) and material choice (e.g., choice between materials of different magnetic moments) may be varied to control the magnitude of the biasing field.

In FIG. 7, a non-magnetic laminate (not shown) may be used to separate the sensor stack 704 from the decoupled thin shield elements 732 or 734. In another implementation, non-magnetic spacer layers are interleaved between the sensor stack 704 and the decoupled thin shield elements 732 and 734.

Figure 8:
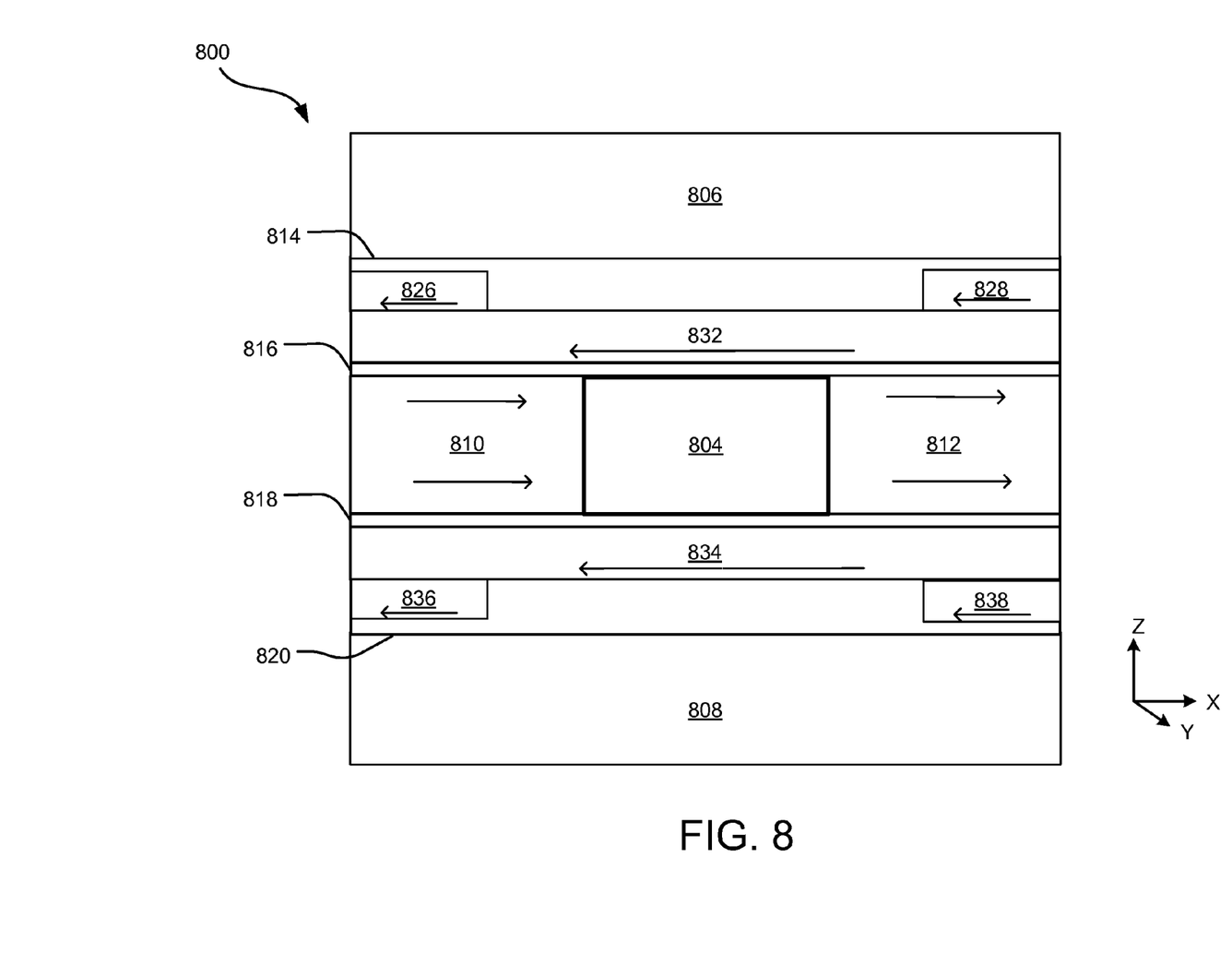
FIG. 8 illustrates another example MR sensor with locally enhanced shield permeability.

Regions of locally enhanced permeability may also be implemented in designs with side shields that allow for improved cross-track resolution. FIG. 8 illustrates an example MR sensor 800 with side shields 810 and 812 and regions of locally enhanced permeability proximal to leading and trailing edges of a sensor stack 804. The side shields 810 and 812 may be made from a soft or hard magnetic material and have a magnetic orientation (e.g., shown by arrows in the positive x-direction) that is substantially different from a magnetic orientation of decoupled thin shield elements 832 and 834.

The decoupled thin shield elements 832 and 834 are each decoupled, via non-magnetic spacer layers 814 and 820, from a corresponding main shield element 806 or 808. The main shield elements 806 and 808 may each have a magnetic orientation biased by DCS biasing tabs (not shown) or by an annealing or temperature process. Such magnetic orientation may be in any direction and does not influence the creation of locally enhanced permeability regions in this implementation.

A decoupled thin top shield element 832 has a magnetic orientation biased by top thin shield DCS tabs 826 and 828 (e.g., in the negative x-direction). Similarly, the decoupled thin bottom shield element 834 has a magnetic orientation biased by thin bottom shield DCS tabs 836 and 838 (e.g., also in the negative x-direction). Non-magnetic spacer layers 816 and 818 separate the decoupled thin shield elements 832 and 834 from the side shields 810 and 812 and the sensor stack 804.

Figure 9:
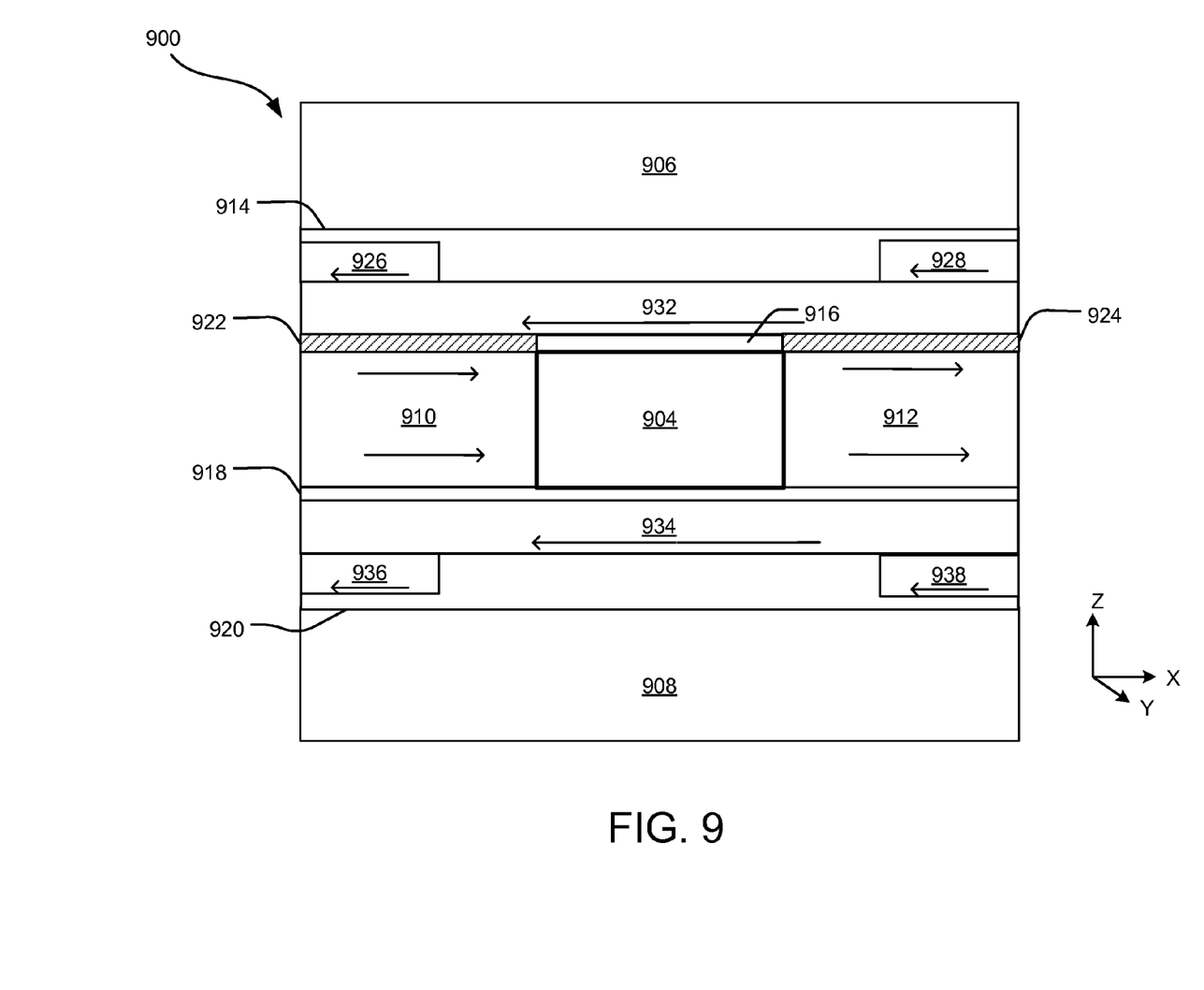
FIG. 9 illustrates another example MR sensor with locally enhanced shield permeability.

If the magnetic orientation of one or both of the decoupled thin shield elements 832 and 834 is substantially different from the orientation of the side shields 810 and 812, as illustrated by the antiparallel implementation of FIG. 8, areas of locally increased permeability are created within one or both of the decoupled thin shield elements 832 and 834. Such areas may be proximal or adjacent to leading or trailing edges of the sensor stack 804. However, in practice, the magnetic orientation of soft side shields 810 and 812 may rotate if a mechanism is not used to ensure biasing in a predetermined direction. FIG. 9 illustrates such a mechanism.

FIG. 9 illustrates an example MR sensor 900 with side shields 910 and 912 and anti-ferromagnetic Ruderman-Kittel-Kasuya-Yosida (RKKY) layers 922 and 924. The RKKY layers 922 and 924 exchange-couple the side shields 910 and 912 to a decoupled thin top shield element 932. The anti-ferromagnetic RKKY layers 922 and 924 ensure antiparallel coupling between the decoupled thin top shield element 932 and the side shields 910 and 912.

The decoupled thin top shield element 932 is decoupled, via a non-magnetic spacer layer 914, from a corresponding top main shield element 906. Additionally, the MR sensor 900 includes a bottom main shield element 908 decoupled, via a non-magnetic spacer layer 920, from a decoupled thin bottom shield element 934. DCS tabs 926 and 928 set the magnetic orientation of the decoupled thin top shield element 932, and DCS tabs 936 and 938 set the magnetic orientation of the decoupled thin bottom shield element 934. Non-magnetic spacer layers 916 and 918 separate the side sensor stack 904 from the decoupled thin shield elements 932 and 934 respectively. Aside from the coupling accomplished by the anti-ferromagnetic RKKY layers 922 and 924, the MR sensor 900 operates in the same or substantially the same manner as the MR sensor 800 illustrated and described with respect to FIG. 8.

Figure 10:
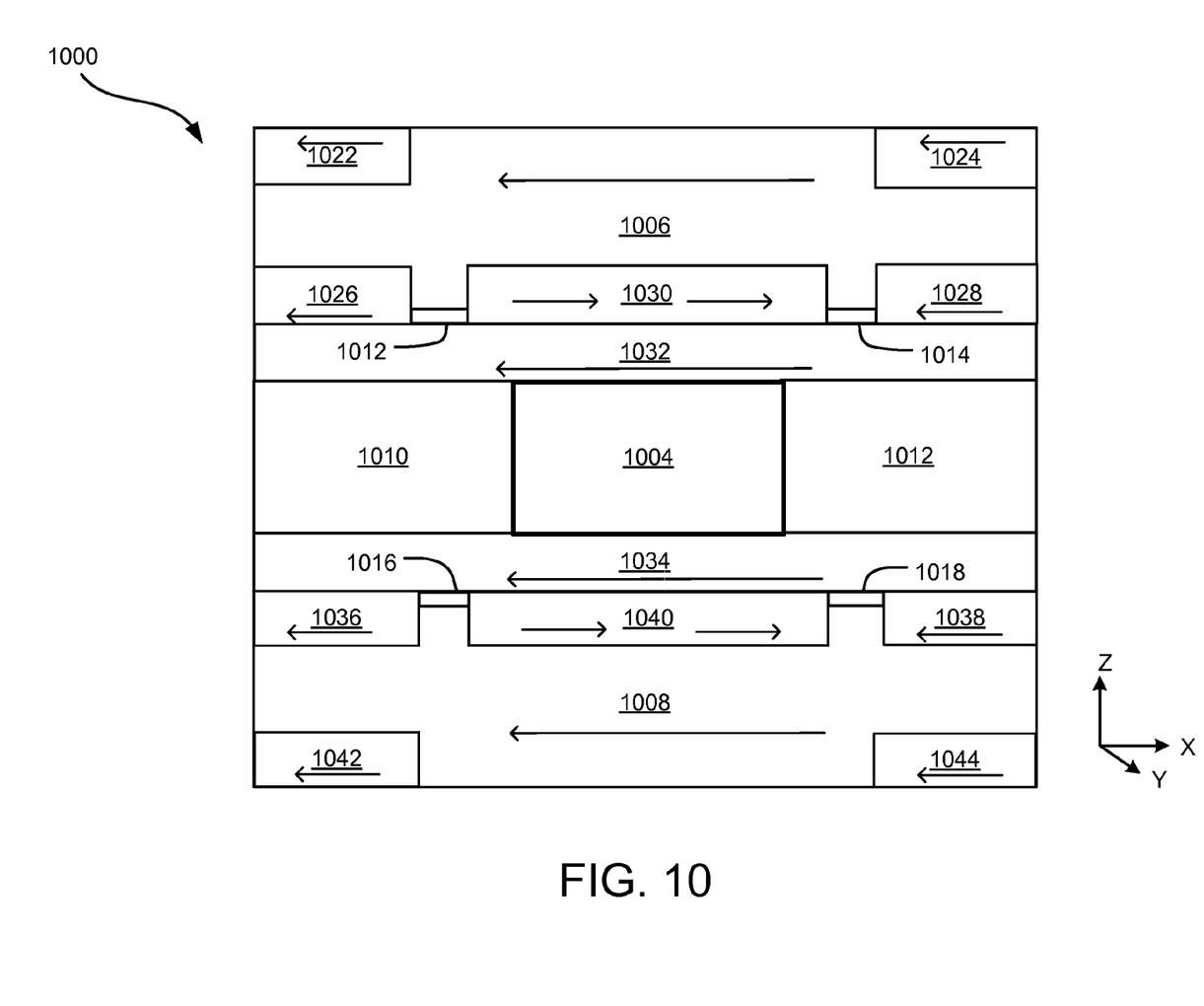
FIG. 10 illustrates another example MR sensor with locally enhanced shield permeability.

FIG. 10 illustrates an example MR sensor 1000 with side shields 1010 and 1012 and local permeability tuning elements 1030 and 1040 proximal to leading and trailing edges of a sensor stack 1004. In FIG. 10, the regions of enhanced permeability may exist within the local permeability tuning elements 1030 and 1040 regardless of the magnetic orientation of the side shields 1010 and 1012.

As in other implementations disclosed herein, the local permeability tuning elements 1030 and 1040 may be regions of permanent magnetic material, AFM material, or other structures that provide a magnetic bias. The magnetic orientation of such regions is substantially different from or antiparallel to a biased global shield magnetic orientation of main shield elements 1006 and 1008. This antiparallel biasing creates regions of decreased anisotropy and locally enhanced permeability substantially within the local permeability tuning elements 1030 and 1040.

Composite top and bottom shields each include a main shield element (e.g., the main shield elements 1006 and 1008) and a corresponding decoupled thin shield element (e.g., decoupled thin shield elements 1032 and 1034). The magnetic orientation of each of the top main shield elements 1006 and 1008 and decoupled thin shield elements 1032 and 1034 are fixed in a like direction (e.g., the negative x-direction) by respective DCS elements (e.g., DCS elements 1022, 1024, 1026, 1028, 1036, 1038, 1042, and 1044) that are recessed from close vicinity of the sensor stack 1004. Non-magnetic spacer layers 1012, 1014, 1016, and 1018 are interleaved between the decoupled thin shield elements (e.g., 1032 and 1034) and the adjacent main shield element (e.g., 1006 or 1008, respectively). A non-magnetic laminate (not shown) or additional non-magnetic spacer layers (not shown) may be used to separate the sensor stack 1004 from the decoupled thin shield elements 1032 and 1034.

Figure 11:
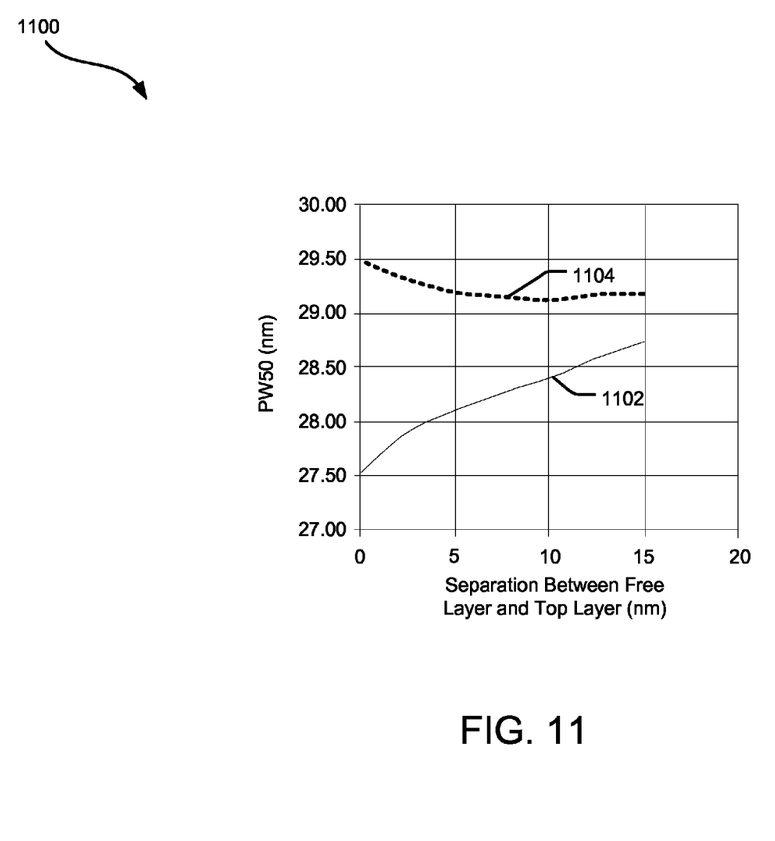
FIG. 11 illustrates an example graph illustrating PW50 of a read pulse due to a transition of an isolated data bit.

FIG. 11 is a graph 1100 illustrating PW50 of a read pulse due to a transition of an isolated data bit for different separations between the free layer of a sensor stack and a top shield (e.g., the shield in closer proximity to the free layer). This relationship is illustrated for two different MR sensors (specifically, spin-valve MR sensors) that include PM elements. The PM elements are positioned along the cross-track direction on opposite sides of a central sensor stack of each of the MR sensors (e.g., such as in the implementations of FIG. 1 or FIG. 3). The line 1104 illustrates PW50 for one of the MR sensors, which has a global shield magnetic orientation parallel to the PM elements. The line 1102 illustrates PW50 for the other one of the MR sensors, which has a global shield magnetic orientation anti-parallel to the PM elements. The graph 1100 indicates that the anti-parallel biasing configuration (illustrated by the line 1102) demonstrates better PW50 (i.e., higher SNR) than the parallel biasing configuration (illustrated by the line 1104) for all positions of the free layer between 0 and 20 nanometers from the top shield.

The specific steps discussed with respect to each of the implementations disclosed herein are a matter of choice and may depend on the materials utilized and/or design criteria of a given system. All magnetic biasing angles discussed herein may be predetermined angles optimized for design criteria. The above specification, examples, and data provide a complete description of the structure and use of exemplary implementations of the invention. Since many implementations of the invention can be made without departing from the spirit and scope of the invention, the invention resides in the claims hereinafter appended.

What is claimed is:

1. A sensor apparatus comprising:
a sensor stack located within a shielding structure; and
permanent magnetic elements on opposite sides of the sensor stack, wherein a predetermined angular separation between a magnetic orientation of the permanent magnetic elements and a magnetic orientation of the shielding structure influences permeability of the shielding structure so that a first region of the shielding structure near the sensor stack has a permeability that is greater than a permeability of a second region of the shielding structure away from the sensor stack.

2. The sensor apparatus of claim 1, wherein the first region is proximal to at least one of a leading or trailing edge of the sensor stack.

3. The sensor apparatus of claim 1, wherein the magnetic orientation of the permanent magnetic elements is substantially antiparallel to the magnetic orientation of the shielding structure.

4. The sensor apparatus of claim 1, wherein a magnetic orientation of the shielding structure is biased with domain control stabilization tabs.

5. The sensor apparatus of claim 1, wherein the shielding structure includes a main shield element and a decoupled thin shield element.

6. The sensor apparatus of claim 1, wherein the magnetic orientation of the material in the enhanced permeability region is substantially antiparallel to the magnetic orientation of the shielding structure.

7. An apparatus comprising:
a shield;
a sensor stack proximal to an inner surface of the shield, and
a local permeability tuning element, wherein a predetermined angular separation between a magnetic orientation of material of the local permeability tuning element and a magnetic orientation of the shield creates an enhanced permeability region within the shield, the enhanced permeability region having a permeability that is greater than a global permeability of the shield.

8. The apparatus of claim 7, wherein the magnetic orientation of the material in the enhanced permeability region is substantially antiparallel to the magnetic orientation of the shield.

9. The apparatus of claim 7, wherein the local permeability tuning element is recessed from an air bearing surface relative to the sensor stack.

10. The apparatus of claim 7, wherein a magnetic orientation of the shielding structure is biased with domain control stabilization tabs.

11. The apparatus of claim 7, wherein the shield includes a main shield element and a decoupled thin shield element.

12. The apparatus of claim 7, further comprising side shields.

13. The apparatus of claim 7, wherein the enhanced permeability region is proximal to at least one of a leading or trailing edge of the sensor stack.

14. A read element comprising:
a shield that includes a main shield element and a decoupled thin shield element, wherein the decoupled thin shield element is between the main shield element and a sensor stack; and
an enhanced permeability region within the decoupled thin shield element with a permeability that is greater than a global permeability of the shield.

15. The read element of claim 14, further comprising:
permanent magnetic elements on opposite sides of a sensor stack, wherein a predetermined angular separation between a magnetic orientation of the permanent magnetic elements and a magnetic orientation of the decoupled thin shield element creates the enhanced permeability region.

16. The read element of claim 15, wherein the magnetic orientation of the decoupled thin shield element is substantially antiparallel to the magnetic orientation of the permanent magnets.

17. The read element of claim 14, further comprising a local permeability tuning element, wherein a predetermined angular separation between a magnetic orientation of the local permeability tuning element and a magnetic orientation of the decoupled thin shield element creates the enhanced permeability region.

18. The read element of claim 17, wherein the material of the local permeability tuning element is at least one of a permanent magnetic material or an anti-ferromagnetic material.

19. The read element of claim 14, wherein a magnetic orientation of the shielding structure is biased with domain control stabilization tabs.

* * * * *